(12) United States Patent
Baldwin

(10) Patent No.: US 12,335,593 B2
(45) Date of Patent: Jun. 17, 2025

(54) ELECTRICAL RECEPTACLE WITH BUILT-IN CAMERA

(71) Applicant: Titan3 Technology LLC, Tempe, AZ (US)

(72) Inventor: Jeffrey P. Baldwin, Anthem, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 71 days.

(21) Appl. No.: 18/488,815

(22) Filed: Oct. 17, 2023

(65) Prior Publication Data

US 2024/0048836 A1 Feb. 8, 2024

Related U.S. Application Data

(63) Continuation of application No. 17/138,792, filed on Dec. 30, 2020, now abandoned.

(51) Int. Cl.
*H04N 23/57* (2023.01)
*H01R 13/73* (2006.01)
(Continued)

(52) U.S. Cl.
CPC ............. *H04N 23/57* (2023.01); *H01R 13/73* (2013.01); *H01R 24/76* (2013.01); *H04N 7/183* (2013.01);
(Continued)

(58) Field of Classification Search
CPC ........ H04N 23/57; H04N 7/183; H01R 13/73; H01R 24/76; H01R 25/006;
(Continued)

(56) References Cited

U.S. PATENT DOCUMENTS

| 3,522,595 A | 8/1970 | White |
| 4,514,789 A | 4/1985 | Jester |

(Continued)

FOREIGN PATENT DOCUMENTS

| DE | 102016006308 A1 | 10/2017 |
| EP | 3104350 A1 | 12/2016 |

(Continued)

OTHER PUBLICATIONS

AES System Cameras Date First Available Jul. 25, 2016 (Year: 2016) 7 pages.

(Continued)

*Primary Examiner* — James M Pontius
(74) *Attorney, Agent, or Firm* — Kenneth C. Booth; Booth Udall Fuller, PLC

(57) ABSTRACT

An electrical outlet for attachment to an electrical box comprising an electrical outlet body, a plurality of screws, an electrical receptacle, and a camera. The electrical outlet body has a front face surrounded by a top surface, a bottom surface, and two side surfaces, and at least two yokes extending away from the body configured to align with box mounting screw apertures of an electrical box. The plurality of screws extends away from the two side surfaces and each is configured to couple with at least one of a plurality of electrical wires and provide power to the electrical outlet. The electrical receptacle is located on the front face and configured to provide power to an electrical plug. The camera is exposed on the front face, aligned with the electrical receptacle, and configured to generate video data, and transmit the video data to an external device.

20 Claims, 17 Drawing Sheets

(51) Int. Cl.
   *H01R 24/76* (2011.01)
   *H04N 7/18* (2006.01)
   *H01R 25/00* (2006.01)
   *H01R 103/00* (2006.01)

(52) U.S. Cl.
   CPC ........ *H01R 25/006* (2013.01); *H01R 2103/00* (2013.01)

(58) Field of Classification Search
   CPC .... H01R 2103/00; H01R 4/34; H01R 9/2491; H01R 13/6658; H01R 24/70
   See application file for complete search history.

(56) References Cited

U.S. PATENT DOCUMENTS

| | | | |
|---|---|---|---|
| 4,536,694 A | 8/1985 | McCarty | |
| 4,835,343 A | 5/1989 | Graef | |
| 4,897,049 A | 1/1990 | Miller | |
| 5,094,630 A | 3/1992 | Jammet | |
| 5,180,886 A | 1/1993 | Dierenbach | |
| 5,384,428 A | 1/1995 | Luu | |
| 5,401,184 A | 3/1995 | Sundstrom | |
| 5,539,821 A | 7/1996 | Blonder | |
| 5,700,158 A | 12/1997 | Neiser | |
| 5,708,705 A | 1/1998 | Yamashita | |
| 5,769,653 A | 6/1998 | Osterbrock | |
| 5,932,845 A | 8/1999 | Lacy | |
| 6,026,605 A | 2/2000 | Tippett | |
| 6,051,788 A | 4/2000 | Nichols | |
| 6,056,450 A | 5/2000 | Walling | |
| 6,160,219 A | 12/2000 | Maltby | |
| 6,297,450 B1 | 10/2001 | Yu | |
| 6,423,900 B1 | 7/2002 | Soules | |
| 6,511,343 B1 | 1/2003 | Shotey | |
| 6,520,792 B2 | 2/2003 | Chen-Chiang | |
| 6,674,003 B1 | 1/2004 | Torres | |
| 6,697,117 B1 | 2/2004 | Park | |
| 6,752,541 B1 | 6/2004 | Dykyj | |
| 6,864,798 B2 | 3/2005 | Janik | |
| 6,897,381 B2 | 5/2005 | He | |
| 6,923,663 B2 | 8/2005 | Oddsen | |
| 6,977,341 B1 | 12/2005 | Gustaveson, II | |
| 6,981,896 B2 | 1/2006 | Su | |
| 6,993,289 B2 | 1/2006 | Janik | |
| 6,993,417 B2 | 1/2006 | Osann, Jr. | |
| 7,140,922 B2 | 11/2006 | Luu | |
| 7,167,078 B2 | 1/2007 | Pourchot | |
| 7,247,793 B2 | 7/2007 | Hinkson | |
| 7,271,339 B2 | 9/2007 | Dinh | |
| 7,394,019 B2 | 7/2008 | Gesue | |
| 7,582,830 B2 | 9/2009 | Claffy | |
| 7,654,855 B2 | 2/2010 | Liao | |
| 7,833,037 B2 | 11/2010 | Reusche | |
| 7,887,341 B2 | 2/2011 | Liao | |
| 7,896,702 B2 | 3/2011 | Stiehl | |
| 7,902,458 B2 | 3/2011 | Eshelman | |
| 7,930,118 B2 | 4/2011 | Philip | |
| 7,931,008 B2 | 4/2011 | Verner | |
| 7,981,896 B2 | 7/2011 | Bennani | |
| 7,983,064 B2 | 7/2011 | Zhang | |
| 8,308,493 B2 | 11/2012 | Lim | |
| 8,342,861 B2 | 1/2013 | Stiehl | |
| 8,378,625 B2 | 2/2013 | Gourley | |
| 8,456,131 B2 | 6/2013 | Bukow | |
| 8,668,347 B2 | 3/2014 | Ebeling | |
| 8,668,647 B2 | 3/2014 | Eskandari | |
| 8,696,368 B2 * | 4/2014 | Quezada | H01R 25/006 439/108 |
| 8,712,486 B2 | 4/2014 | Sorias | |
| 8,834,210 B2 | 9/2014 | Brausen | |
| 8,864,517 B2 | 10/2014 | Cohen | |
| 8,912,442 B2 | 12/2014 | Smith | |
| 8,951,053 B2 | 2/2015 | Ho | |
| 9,035,180 B2 | 5/2015 | Smith | |
| 9,035,181 B2 | 5/2015 | Smith | |
| 9,065,263 B2 | 6/2015 | Porcano | |
| 9,071,740 B1 | 6/2015 | Duffy | |
| 9,083,180 B2 | 7/2015 | Dodal | |
| 9,113,051 B1 | 8/2015 | Scalisi | |
| 9,124,105 B2 | 9/2015 | Gunderman | |
| 9,329,607 B2 | 5/2016 | Kevelos | |
| 9,362,728 B2 | 6/2016 | Smith | |
| 9,398,667 B2 | 7/2016 | Kevelos | |
| 9,464,795 B2 | 10/2016 | Ebeling | |
| 9,551,454 B2 | 1/2017 | Lipke | |
| D781,241 S | 3/2017 | Knight | |
| 9,732,921 B2 | 8/2017 | Chien | |
| 9,742,111 B2 | 8/2017 | Smith | |
| 9,768,562 B2 | 9/2017 | Smith | |
| 9,769,420 B1 | 9/2017 | Moses | |
| 9,825,414 B2 | 11/2017 | Armstrong | |
| 9,882,313 B2 | 1/2018 | Steinbuchel, IV | |
| 9,882,318 B2 | 1/2018 | Smith | |
| 9,882,361 B2 | 1/2018 | Smith | |
| 9,917,430 B2 | 3/2018 | Smith | |
| 9,941,642 B1 | 4/2018 | Waggoner | |
| 9,997,860 B1 | 6/2018 | Hernandez, Jr. | |
| 10,063,316 B2 | 8/2018 | McColloch | |
| 10,136,534 B2 | 11/2018 | Ebeling | |
| 10,161,806 B2 | 12/2018 | Lermann | |
| 10,276,979 B2 | 4/2019 | Cyzen | |
| 10,305,216 B1 | 5/2019 | Shotey | |
| 10,340,722 B2 | 7/2019 | Rohmer | |
| 10,381,788 B2 | 8/2019 | Smith | |
| 10,381,789 B2 | 8/2019 | Smith | |
| 10,446,970 B2 | 10/2019 | Shotey | |
| 10,505,326 B2 * | 12/2019 | Chien | H01R 13/70 |
| 10,587,067 B2 | 3/2020 | Lager | |
| 10,642,231 B1 | 5/2020 | Billings | |
| 10,644,465 B2 | 5/2020 | Michael | |
| 10,665,996 B2 | 5/2020 | Michael | |
| 10,687,432 B2 | 6/2020 | Ebeling | |
| 10,720,727 B1 | 7/2020 | Shotey | |
| 10,729,223 B2 | 8/2020 | Weaver | |
| 10,764,561 B1 | 9/2020 | Devitt | |
| 10,796,798 B1 | 10/2020 | Stone | |
| 10,903,636 B1 | 1/2021 | Baldwin | |
| 10,985,516 B1 | 4/2021 | Gartside | |
| 11,011,867 B1 | 5/2021 | Shotey | |
| 11,063,396 B2 | 7/2021 | Iaconis | |
| 11,189,975 B1 | 11/2021 | Baldwin | |
| 11,277,587 B1 | 3/2022 | Baldwin | |
| 11,394,157 B2 | 7/2022 | Smith | |
| 11,404,831 B1 | 8/2022 | Baldwin | |
| 11,489,280 B1 | 11/2022 | Baldwin | |
| 11,489,323 B1 | 11/2022 | Baldwin | |
| 11,509,102 B1 | 11/2022 | Baldwin | |
| 11,632,844 B2 | 4/2023 | Ebeling | |
| 11,778,302 B1 * | 10/2023 | Baldwin | H02G 3/14 348/143 |
| 11,916,691 B2 * | 2/2024 | Scalisi | G06F 18/40 |
| 2001/0017339 A1 | 8/2001 | Brotz | |
| 2003/0108099 A1 | 6/2003 | Nagumo | |
| 2003/0201371 A1 | 10/2003 | Zadok | |
| 2004/0121648 A1 | 6/2004 | Voros | |
| 2004/0142601 A1 | 7/2004 | Luu | |
| 2004/0189130 A1 | 9/2004 | Hovanky | |
| 2005/0025360 A1 * | 2/2005 | Gin | H04N 23/56 348/E5.029 |
| 2008/0024605 A1 * | 1/2008 | Osann | G06Q 50/06 348/143 |
| 2008/0088703 A1 | 4/2008 | Dollahite | |
| 2008/0136915 A1 * | 6/2008 | Iwamura | H04N 7/181 348/E7.086 |
| 2008/0157715 A1 | 7/2008 | Rosenboom | |
| 2008/0272258 A1 | 11/2008 | Wysoczynski | |
| 2009/0141477 A1 | 6/2009 | Bhosale | |
| 2010/0118162 A1 | 5/2010 | Saijo | |
| 2012/0007555 A1 | 1/2012 | Bukow | |
| 2012/0025972 A1 | 2/2012 | Boyden | |
| 2012/0068612 A1 | 3/2012 | Ebeling | |
| 2013/0050657 A1 | 2/2013 | Morohoshi | |
| 2013/0100279 A1 | 4/2013 | Nordenfelt | |

(56) References Cited

U.S. PATENT DOCUMENTS

| | | | |
|---|---|---|---|
| 2014/0132475 A1 | 5/2014 | Bhutani | |
| 2014/0162777 A1 | 6/2014 | Hsu | |
| 2014/0274143 A1 | 9/2014 | Trantow | |
| 2014/0320663 A1* | 10/2014 | Chien | F21S 8/035 348/159 |
| 2014/0354219 A1 | 12/2014 | Fan | |
| 2014/0362559 A1* | 12/2014 | Chien | A61L 9/03 362/95 |
| 2014/0375532 A1 | 12/2014 | Chien | |
| 2015/0189226 A1 | 7/2015 | Gravina | |
| 2015/0340826 A1 | 11/2015 | Chien | |
| 2016/0232763 A1* | 8/2016 | Sockol | H04M 11/02 |
| 2016/0277679 A1 | 9/2016 | Kimura | |
| 2016/0285220 A1 | 9/2016 | Haw | |
| 2017/0041530 A1 | 2/2017 | Kimura | |
| 2017/0223109 A1 | 8/2017 | Shoemake | |
| 2018/0013271 A1 | 1/2018 | Goulden | |
| 2018/0188779 A1 | 7/2018 | Allen | |
| 2018/0193545 A1 | 7/2018 | Crnkovich | |
| 2018/0241146 A1 | 8/2018 | Smith | |
| 2018/0253162 A1 | 9/2018 | Wroblewski | |
| 2018/0301882 A1 | 10/2018 | Smith | |
| 2019/0020183 A1 | 1/2019 | Hitchman | |
| 2019/0212230 A1 | 7/2019 | Novosselov | |
| 2019/0219899 A1 | 7/2019 | Vega | |
| 2019/0229478 A1 | 7/2019 | Iaconis | |
| 2020/0120328 A1 | 4/2020 | Hamilton | |
| 2020/0196141 A1 | 6/2020 | Baker | |
| 2020/0216025 A1 | 7/2020 | Le Bourgeois | |
| 2020/0412070 A1 | 12/2020 | Owen | |
| 2021/0098949 A1 | 4/2021 | Diotte | |

FOREIGN PATENT DOCUMENTS

| | | |
|---|---|---|
| JP | 2019056906 A | 4/2019 |
| KR | 20100012881 | 2/2010 |

OTHER PUBLICATIONS

Combination Wireless Wall Mount Charger & USB Outlet, htttps://www.hubbell.com/wiringdevice-kellems/en/Products/Electrical-Electronic/Wiring-Devices/Charging-Solutions/Power-Charging-Stations/USB2028AC/p/3936295#prod-resources-section. Printed on Jan. 28, 2020, 2 pages.

* cited by examiner

ELECTRICAL RECEPTACLE WITH BUILT-IN CAMERA

CROSS REFERENCE TO RELATED APPLICATIONS

This application is a continuation of U.S. Utility patent application Ser. No. 17/138,792 entitled "Electrical Receptacle With Built-In Camera" to Jeffrey P. Baldwin that was filed on Dec. 30, 2020, the disclosure of which is hereby incorporated herein by reference.

TECHNICAL FIELD

Aspects of this document relate generally to electrical outlets, and more specifically to electrical outlets with a receptacle replaced by a built-in camera.

BACKGROUND

Electrical outlets commonly come with two electrical receptacles in each electrical outlet. This allows at least two electrical devices to be plugged into and receive power from the electrical outlet. Among the devices made to be plugged into the electrical outlet are cameras that a homeowner or business operator might use to obtain video data of a room. However, the purpose of these cameras can be interfered with. For example, a toddler might unplug the camera, making the parent unable to check in on the room through the video data. As another example, an intruder can easily spot that a camera is plugged into the outlet, and make efforts to circumvent the extra security provided by the camera.

SUMMARY

Aspects of this document relate to an electrical outlet for attachment to an electrical box, comprising an electrical outlet body having a front face surrounded by a top surface, a bottom surface, and two side surfaces, and at least two yokes extending away from the body, wherein a first yoke of the at least two yokes extends away from the top surface of the body and a second yoke of the at least two yokes extends away from the bottom surface of the body, the first and second yokes configured to align with box mounting screw apertures of an electrical box, a plurality of screws extending away from the two side surfaces of the body and each configured to couple with at least one of a plurality of electrical wires and provide power to the electrical outlet, only one electrical receptacle on the front face having at least two plug apertures extending into the front face of the body, wherein the at least two plug apertures are electrically coupled to the plurality of screws and configured to provide power to an electrical plug when the electrical plug is inserted into the only one electrical receptacle, a printed circuit board inside the body electrically coupled to the plurality of screws and configured to wirelessly transmit data generated by the electrical outlet to an external device, and a camera exposed on the front face and aligned with the only one electrical receptacle along an axis passing through the top surface and the bottom surface of the body, wherein the camera is electrically coupled to the printed circuit board, and configured to receive power from the printed circuit board, generate video data, and pass the video data to the printed circuit board for transmission to the external device.

Particular embodiments may comprise one or more of the following features. The electrical outlet may be incorporated into a duplex-style outlet having a first electrical receptacle position and a second electrical receptacle position, the only one electrical receptacle may be located in the first electrical receptacle position, and the camera may be located in the second electrical receptacle position. The front face may have a rectangular shape. The camera may be located between the top surface and the only one electrical receptacle. The camera may be configured to rotate within the body.

Aspects of this document relate to an electrical outlet for attachment to an electrical box comprising an electrical outlet body having a front face surrounded by a top surface, a bottom surface, and two side surfaces, and at least one yoke extending away from the body, the at least one yoke configured to align with box mounting screw apertures of an electrical box, a plurality of screws extending away from the body and each configured to couple with at least one of a plurality of electrical wires and provide power to the electrical outlet, an electrical receptacle on the front face having a plurality of plug apertures extending into the front face of the body, wherein the plurality of plug apertures is electrically coupled to the plurality of screws and configured to provide power to an electrical plug when the electrical plug is inserted into the electrical receptacle, and a camera exposed on the front face and aligned with the electrical receptacle along an axis passing through the top surface and the bottom surface of the body, wherein the camera is configured to receive power from the plurality of screws, generate video data, and transmit the video data to an external device.

Particular embodiments may comprise one or more of the following features. The electrical receptacle may be only one electrical receptacle. The camera may extend forward from the front face. The electrical outlet may be incorporated into a duplex-style outlet having a first electrical receptacle position and a second electrical receptacle position, the electrical receptacle may be located in the first electrical receptacle position, and the camera may be located in the second electrical receptacle position. The camera may be configured to wirelessly transmit the video data to an external device. The camera may be located between the top surface and the electrical receptacle. The camera may be configured to rotate within the body.

Aspects of this document relate to a single-gang electrical outlet comprising an electrical outlet body having a front face bordered by a top surface and a bottom surface, and at least one yoke extending away from the body, the at least one yoke configured to align with box mounting screw apertures of an electrical box, a plurality of screws extending away from the body and each configured to couple with at least one of a plurality of electrical wires and provide power to the electrical outlet, and a first electrical receptacle position on the front face and a second electrical receptacle position on the front face, wherein an electrical receptacle is in the first electrical receptacle position, the electrical receptacle having a plurality of plug apertures extending into the front face of the body, wherein the plurality of plug apertures is electrically coupled to the plurality of screws and configured to provide power to an electrical plug when the electrical plug is inserted into the electrical receptacle, and wherein a camera is in the second electrical receptacle position and the camera is configured to receive power from the plurality of screws, generate video data, and transmit the video data to an external device.

Particular embodiments may comprise one or more of the following features. The first electrical receptacle position and the second electrical receptacle position may be aligned along an axis passing through the top surface and the bottom surface of the body. The electrical outlet may further comprise a printed circuit board inside the body electrically coupled to the plurality of screws, wherein the camera is electrically coupled to the printed circuit board and receives power from the plurality of screws through the printed circuit board. The electrical receptacle may be only one electrical receptacle. The camera may extend forward from the front face. The electrical outlet may be incorporated into a duplex-style outlet. The camera may be located between the top surface and the electrical receptacle. The camera may be configured to rotate within the body.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
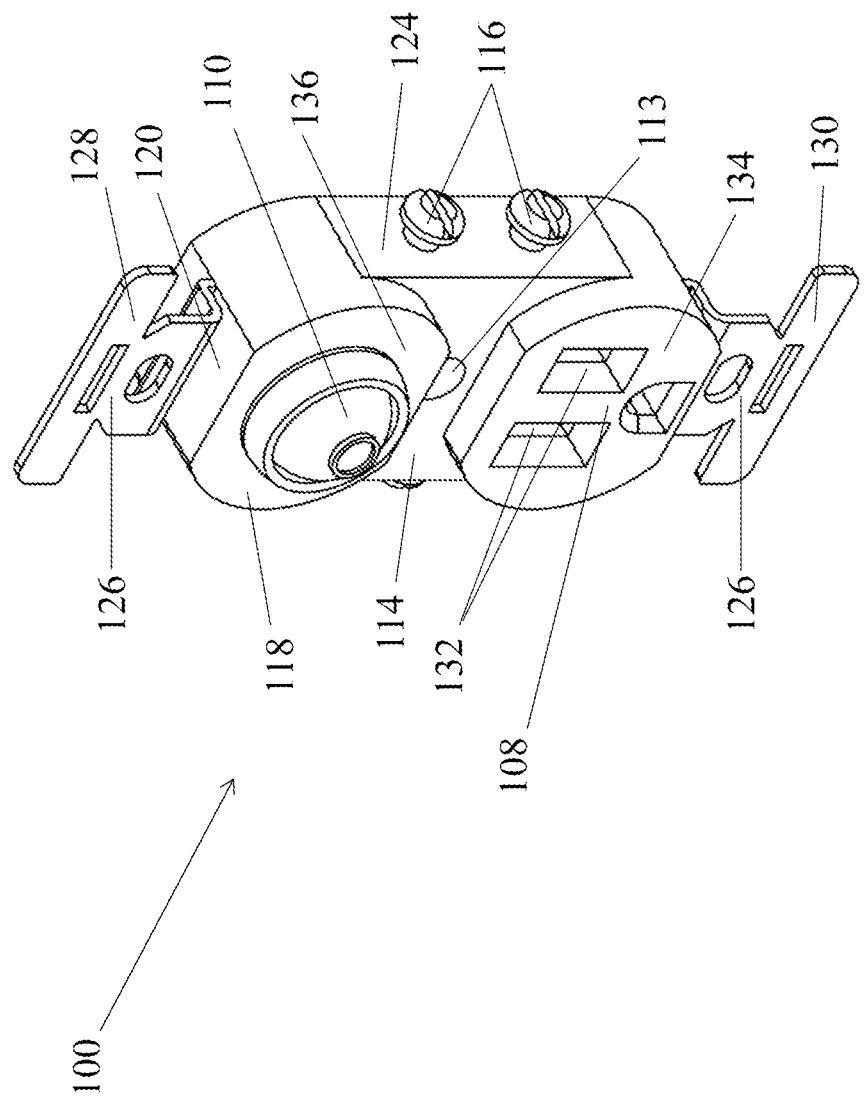
FIG. 1 is a perspective view of a first embodiment of an electrical receptacle with a built-in camera.
Figure 2:
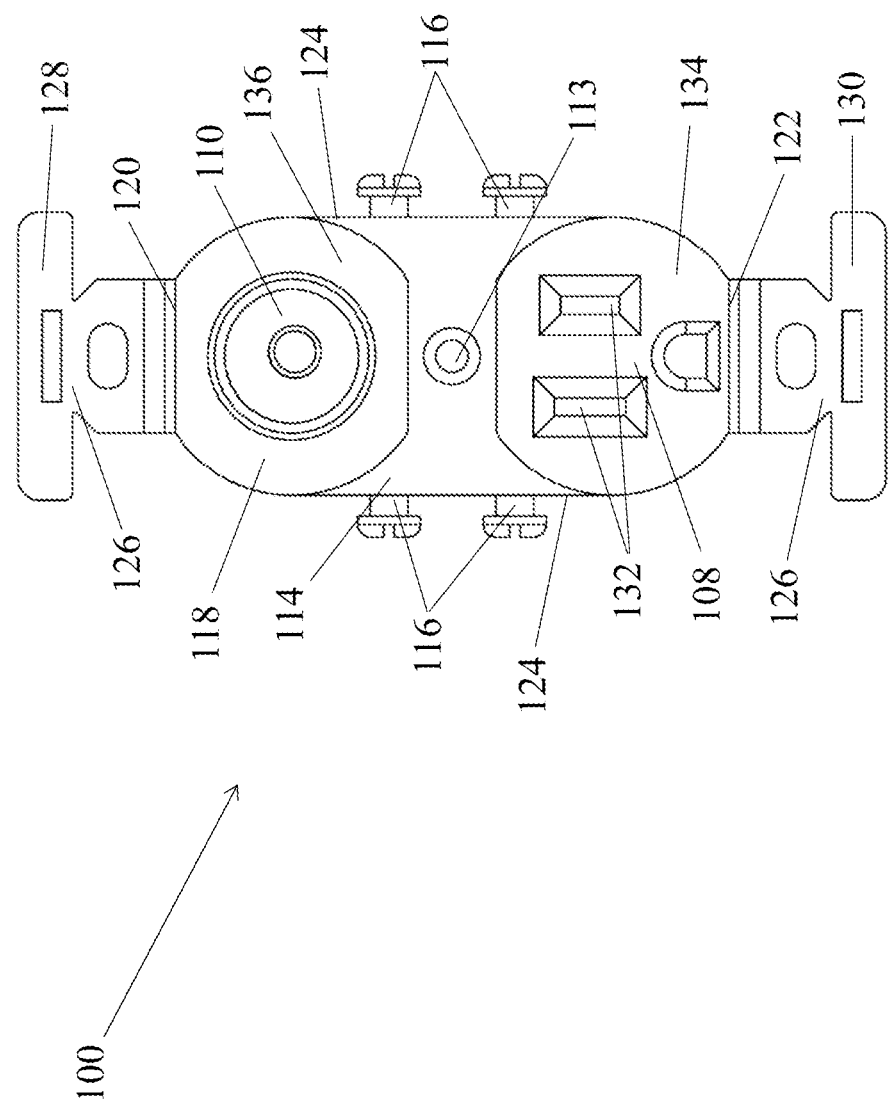
FIG. 2 is a front view of the electrical receptacle shown in FIG. 1.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure concerns an electrical outlet 100, 102, 104, 106 for attachment to an electrical box. The electrical outlet 100, 102, 104, 106 is similar to a typical electrical outlet with two receptacles 108, but one of the two typical receptacles 108 is replaced with a camera 110, 112. A variety of different implementations of the electrical outlet 100, 102, 104, 106 are discussed below. It should be understood that the components depicted and discussed are non-limiting examples, and that the contemplated components may be combined with any of the other components in other implementations.

As illustrated in FIGS. 1-4, the electrical outlet 100 is a traditional electrical outlet with a wall plate mounting screw aperture 113 extending through a center of the electrical outlet 100. The electrical outlet 100 comprises an electrical outlet body 114, a plurality of screws 116, an electrical receptacle 108, and a camera 110. The electrical outlet body 114 has a front face 118. The front face 118 is surrounded by a top surface 120, a bottom surface 122, and two side surfaces 124 of the electrical outlet body 114. The electrical body 114 also has at least two yokes 126 extending away from the body 114. Alternatively, the electrical body 114 may have at least one yoke 126. The yokes 126 may be configured to align with box mounting screw apertures of an electrical box (not shown). For example, as shown in FIGS. 1-4, a first yoke 128 of the at least two yokes 126 extends away from the top surface 120 and a second yoke 130 of the at least two yokes 126 extends away from the bottom surface 122. Once aligned with the box mounting screw apertures, the yokes 126 can be coupled to the electrical box by inserting a box mounting screw through the yokes 126 and into the box mounting screw apertures.

The plurality of screws 116 extend away from the electrical outlet body 114. Each of the plurality of screws 116 is configured to couple with at least one of a plurality of electrical wires 131 (see FIG. 17). Thus, when the plurality of screws 116 is coupled with the plurality of electrical wires 131 and power is supplied to the electrical wires 131, the plurality of screws 116 provides power to the electrical outlet 100. The plurality of screws 116 may extend away from the two side surfaces 124 of the electrical outlet body 114, as shown in FIG. 1.

The electrical receptacle 108 is located on the front face 118 and has at least two plug apertures 132 extending into the front face 118 of the electrical outlet body 114. The at least two plug apertures 132 are electrically coupled to the plurality of screws 116. Thus, the at least two plug apertures 132 are configured to provide power to an electrical plug when the electrical plug is inserted into the electrical receptacle 108. The electrical receptacle 108 may be only one electrical receptacle 108, without any other electrical receptacles 108 on the electrical outlet body 114.

Figure 3:
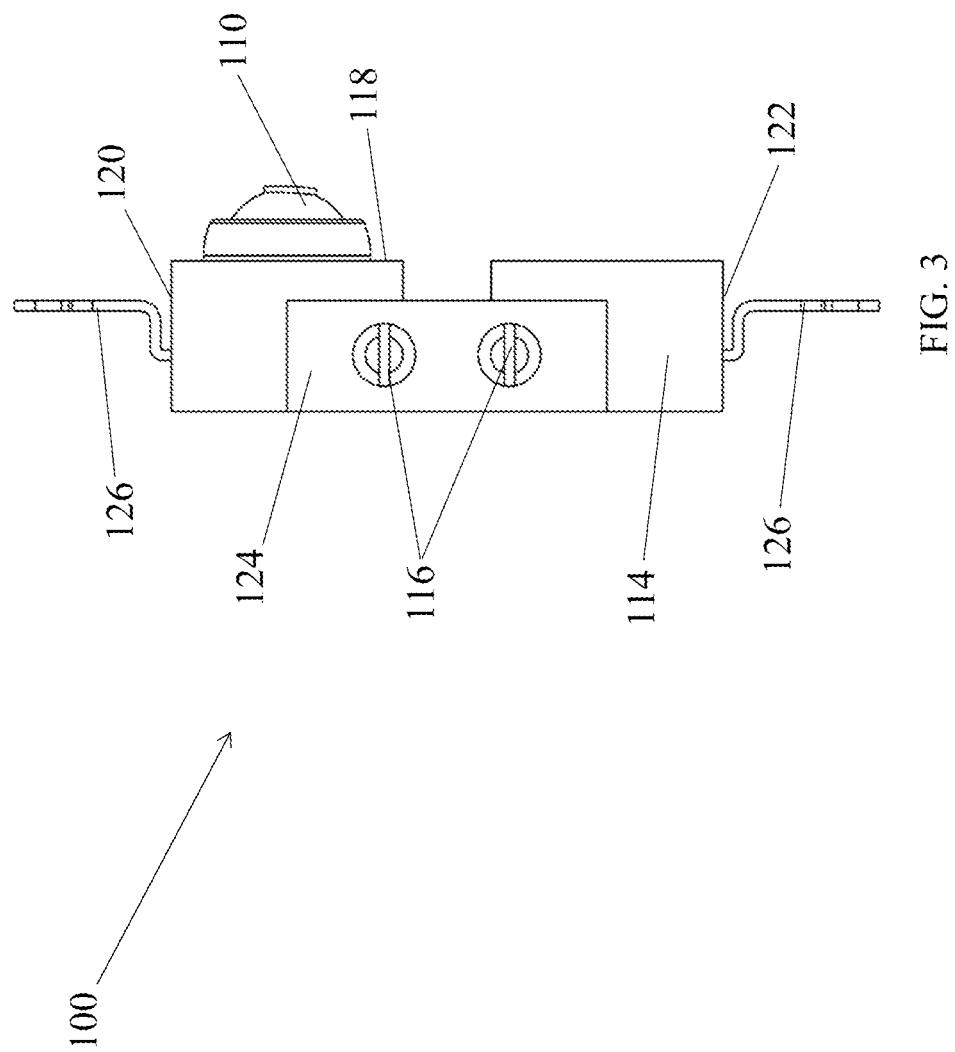
FIG. 3 is a side view of the electrical receptacle shown in FIG. 1.
Figure 4:
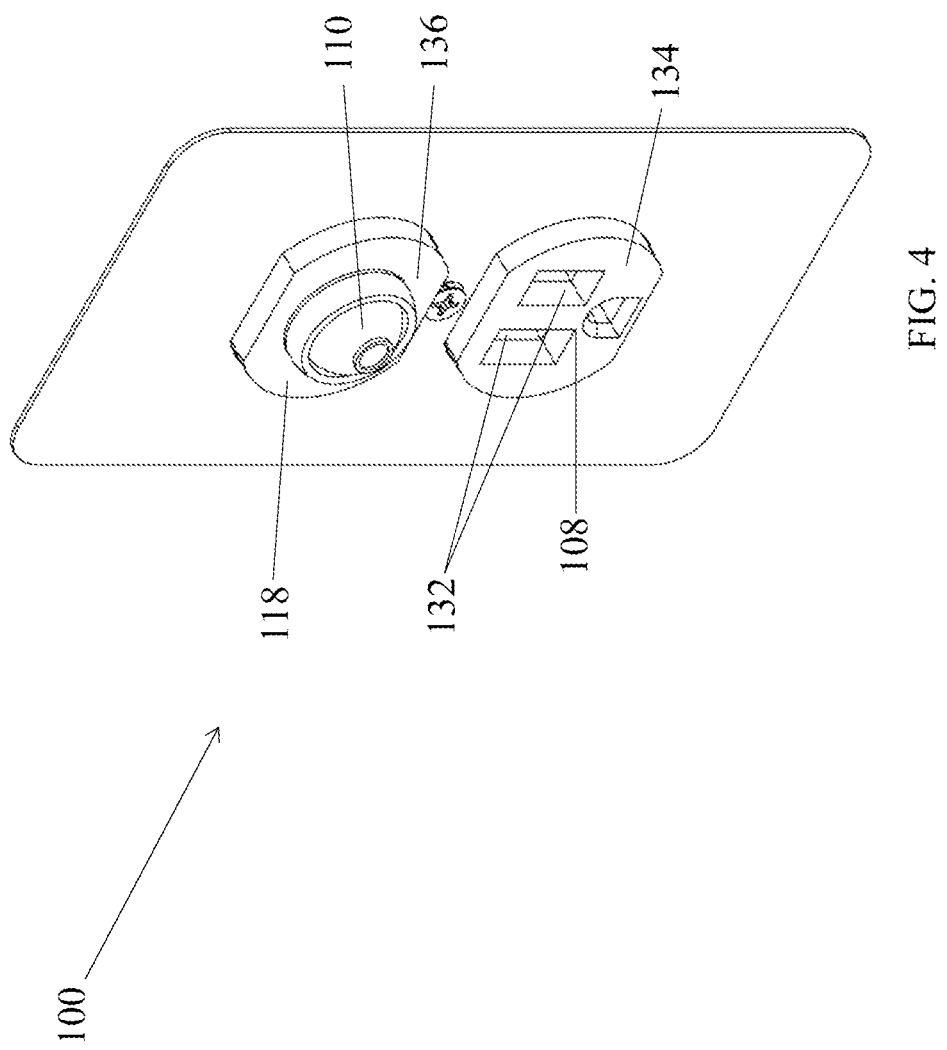
FIG. 4 is a perspective view of the electrical receptacle shown in FIG. 1 with a wall
plate installed.
Figure 5:
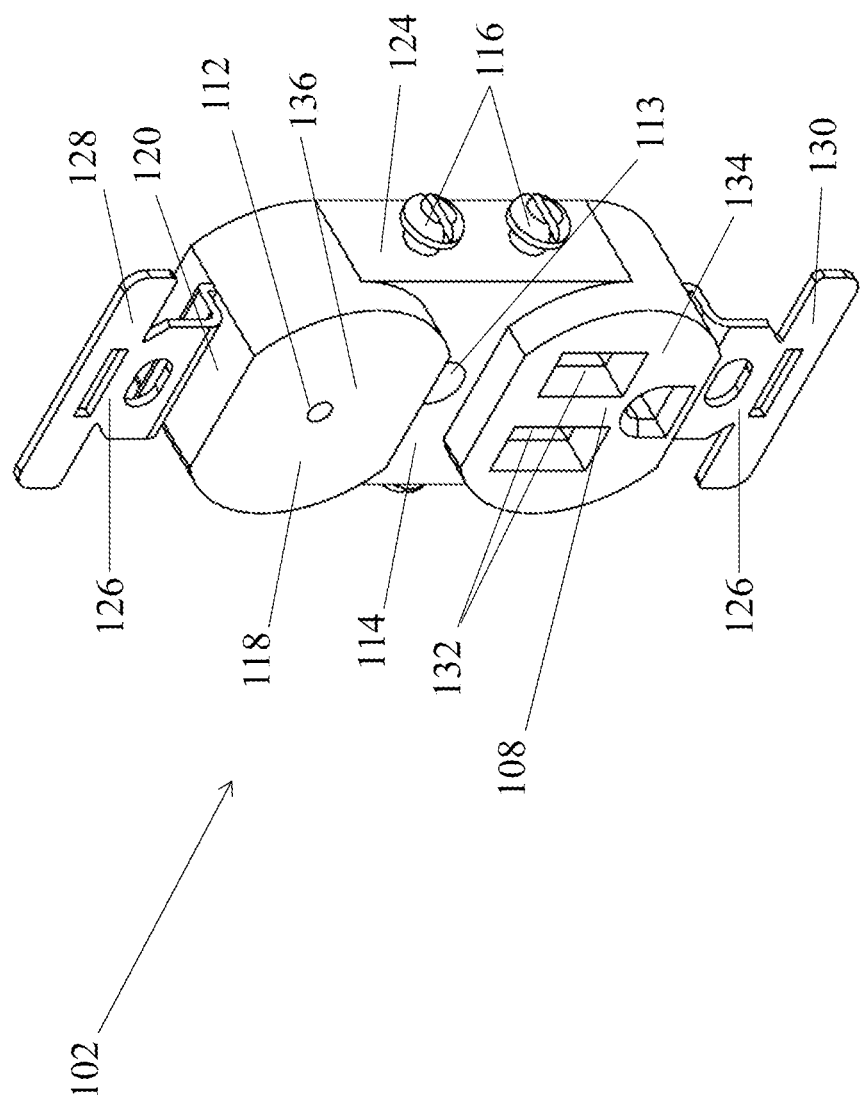
FIG. 5 is a perspective view of a second embodiment of an electrical receptacle with a
built-in camera.
Figure 6:
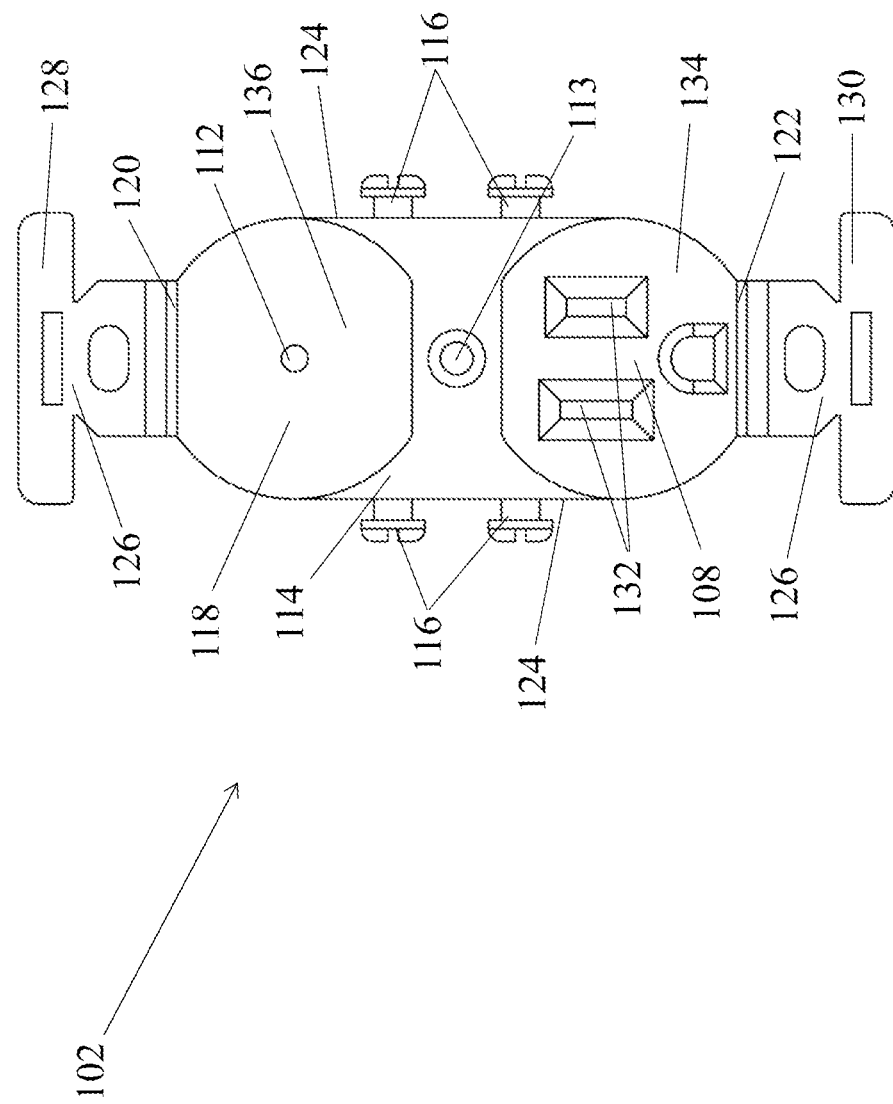
FIG. 6 is a front view of the electrical receptacle shown in FIG. 5.

The camera 110 is exposed on the front face 118 of the electrical outlet body 114 and may be located between the top surface 120 and the electrical receptacle 108. A portion of the camera 110 may extend forward from the front face 118, as shown in FIG. 3. However, a portion or a majority of the camera 110 may also be located behind the front face 118 within the electrical outlet body 114. In embodiments such as electrical outlet 100, the camera 110 may be configured to capture images to either side of the electrical outlet 100. For example, if the electrical outlet 100 were installed in a hallway, the electrical outlet 100 could capture images facing either direction down the hallway. The camera 110 may be configured to rotate within the electrical outlet body 114 to capture images at different angles.

The camera 110 may be aligned with the electrical receptacle 108 along an axis passing through the top surface 120 and the bottom surface 122 of the electrical outlet body 114. In some embodiments, the electrical outlet 100 is incorporated into a duplex-style outlet. The duplex-style outlet has a first electrical receptacle position 134 and a second electrical receptacle position 136. In such an embodiment, the electrical receptacle 108 is located in the first electrical receptacle position 134 and the camera 110 is located in the second electrical receptacle position 136. The camera 110 is configured to receive power from the plurality of screws 116, generate video data, and transmit the video data to an external device. The video data may be transmitted wirelessly, such as over Bluetooth or Wi-Fi. Alternatively, the camera 110 may be hardwired to the external device and the video data may be transmitted through the hardwired connection. The external device may be a device with internet connectivity which makes the video available for viewing online. Alternatively, the external device may be a monitor which displays the video data.

Figure 17:
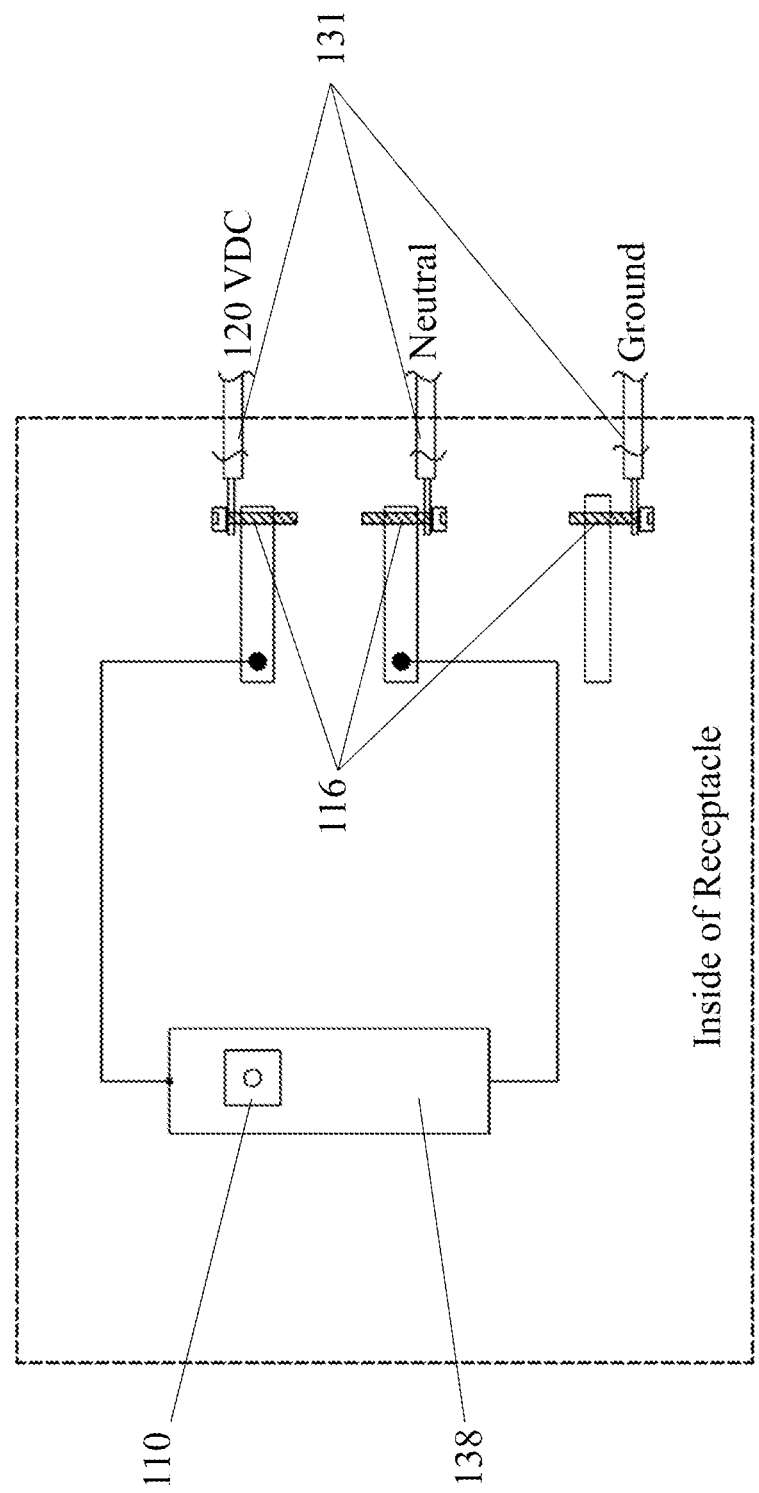
FIG. 17 is a schematic illustrating the electrical connections of the camera.

The electrical outlet 100 may further comprise a printed circuit board 138 inside of the electrical outlet body 114 (see FIG. 17). The printed circuit board 138 is electrically coupled to the plurality of screws 116. The camera 110 may receive power from the printed circuit board 138 and may pass the video data to the printed circuit board 138 for transmission to the external device. The printed circuit board 138 may be configured to transmit all data generated by the electrical outlet 100 to the external device. For example, additional devices could be included in the electrical outlet 100 along with the camera 110, such as, for example, a temperature sensor, a motion sensor, and/or a microphone. The data collected by these sensors could also be transmitted to the external device.

Figure 7:
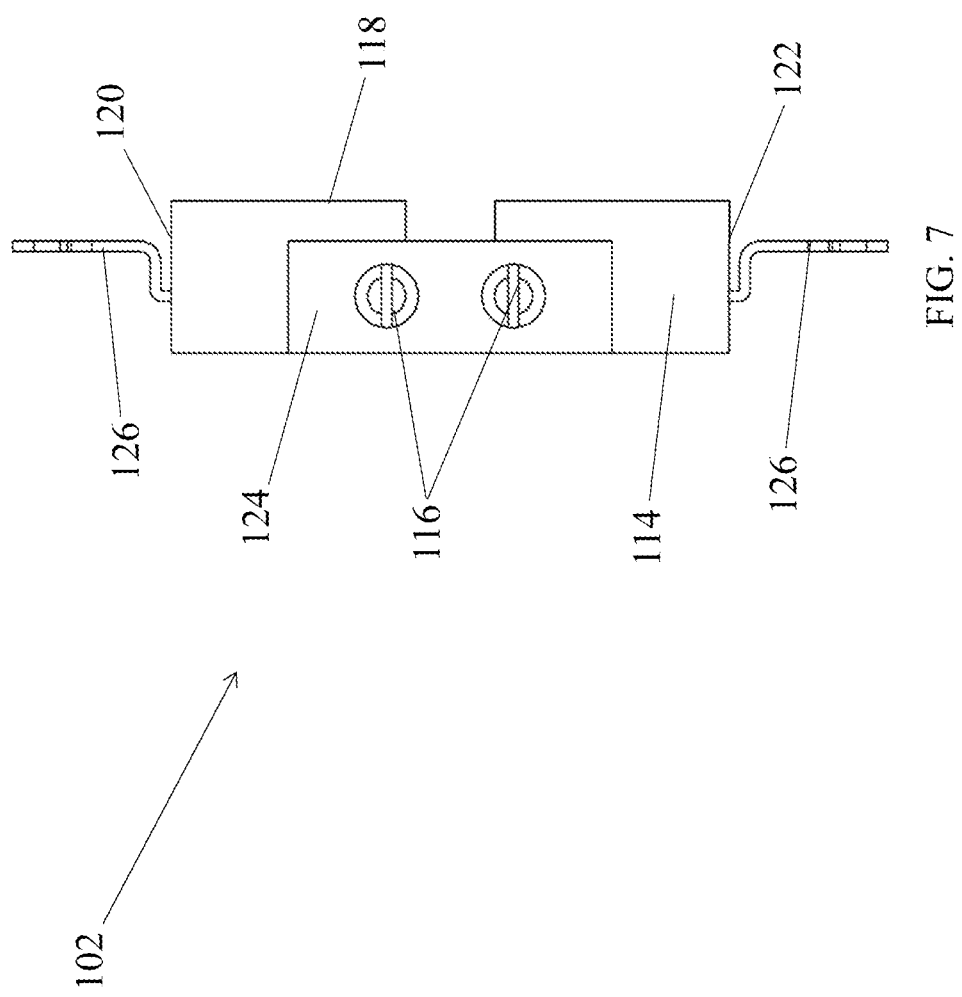
FIG. 7 is a side view of the electrical receptacle shown in FIG. 5.
Figure 8:
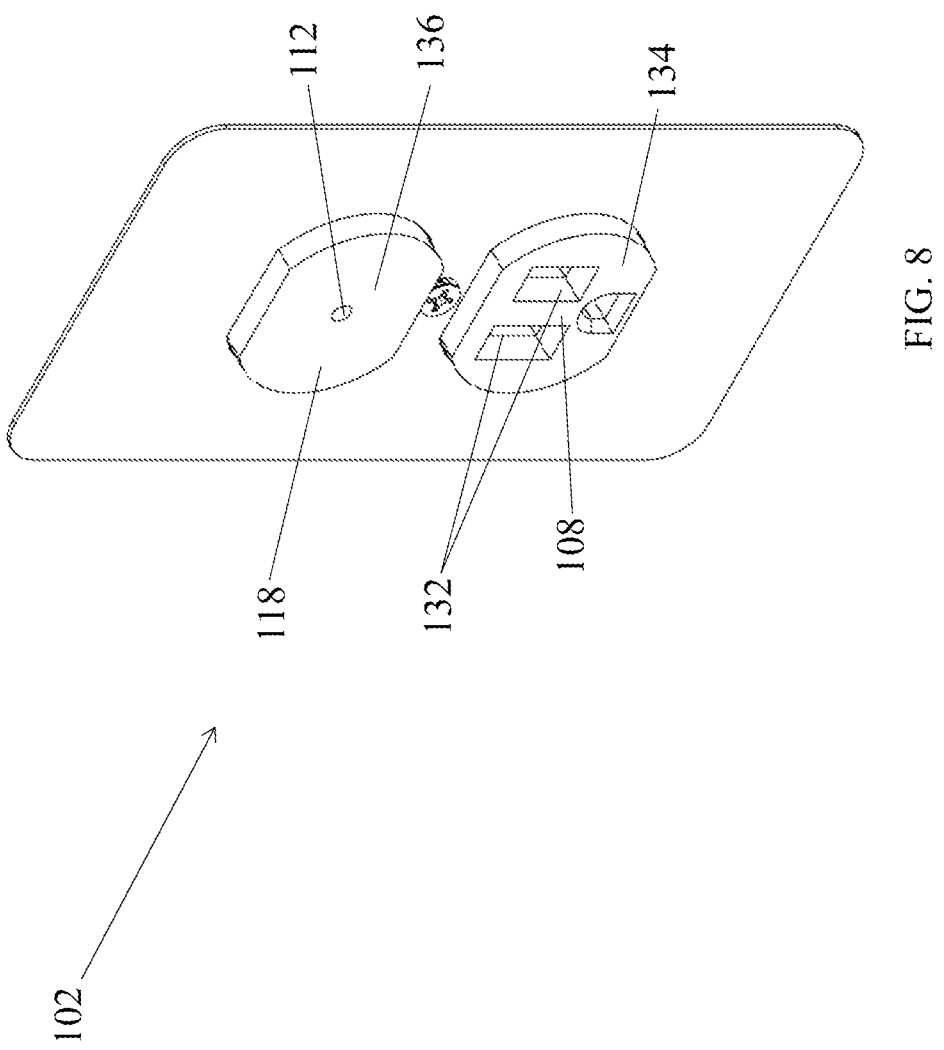
FIG. 8 is a perspective view of the electrical receptacle shown in FIG. 5 with a wall plate installed.
Figure 9:
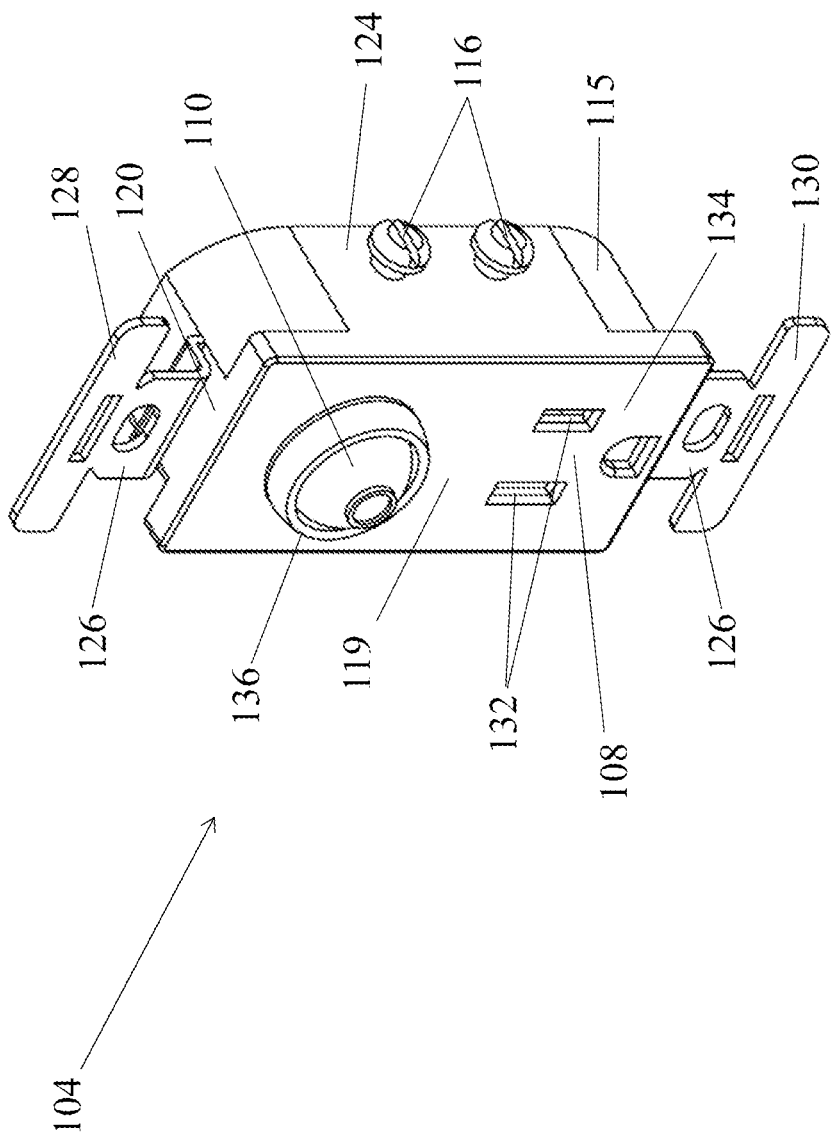
FIG. 9 is a perspective view of a first embodiment of an electrical receptacle with a
built-in camera.
Figure 10:
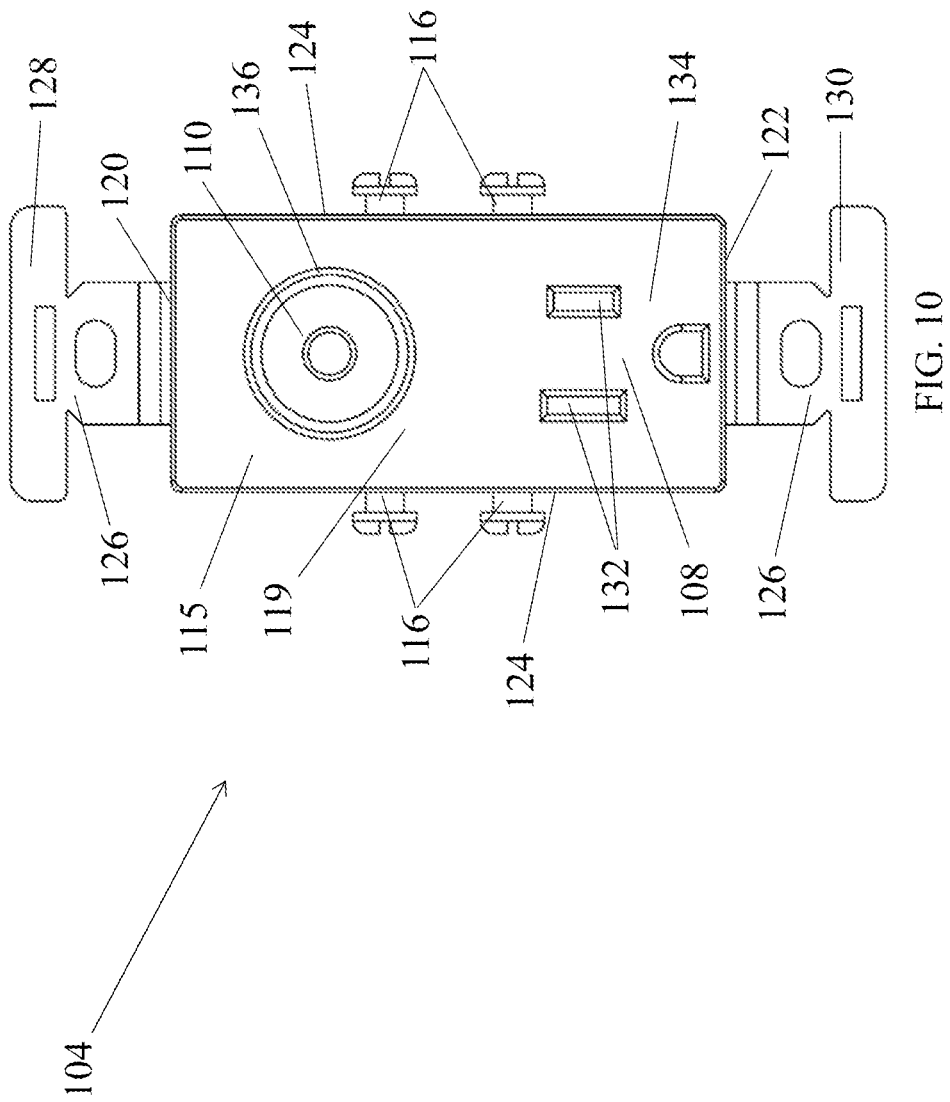
FIG. 10 is a front view of the electrical receptacle shown in FIG. 9.
Figure 11:
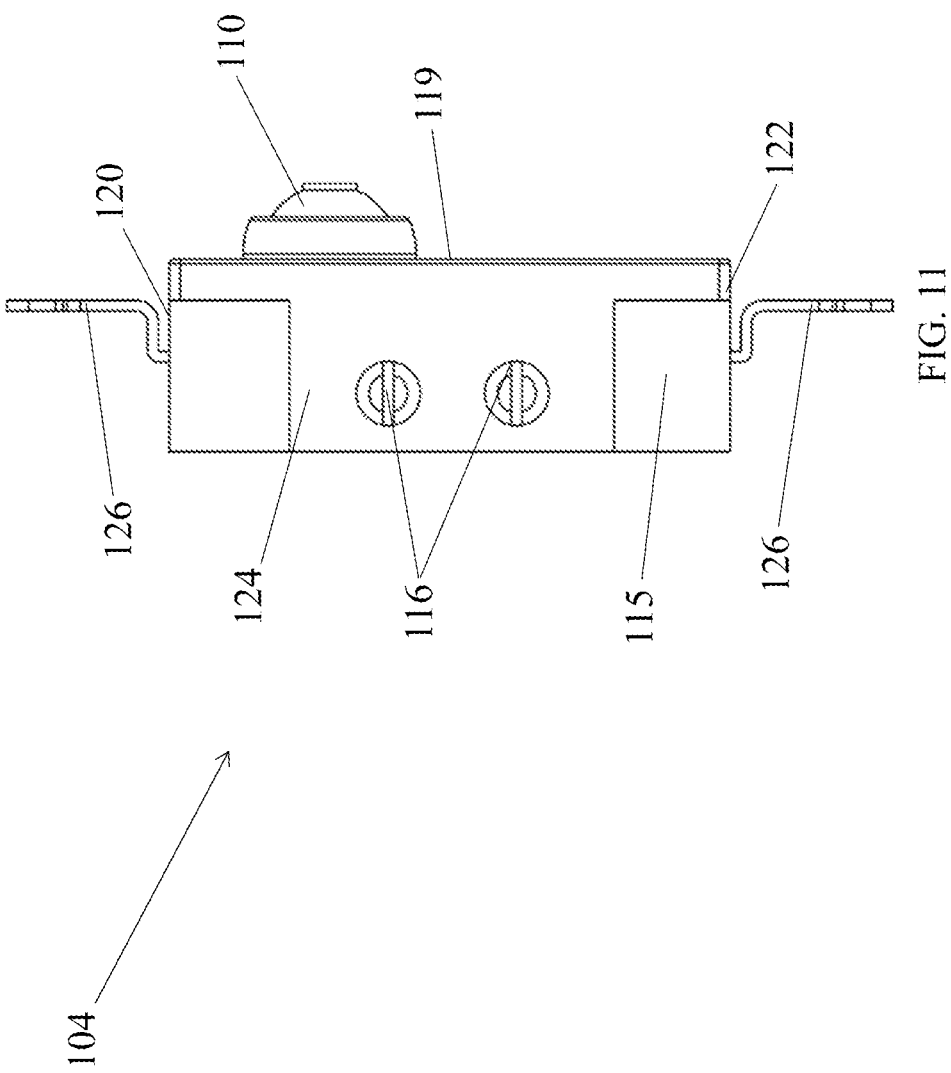
FIG. 11 is a side view of the electrical receptacle shown in FIG. 9.
Figure 12:
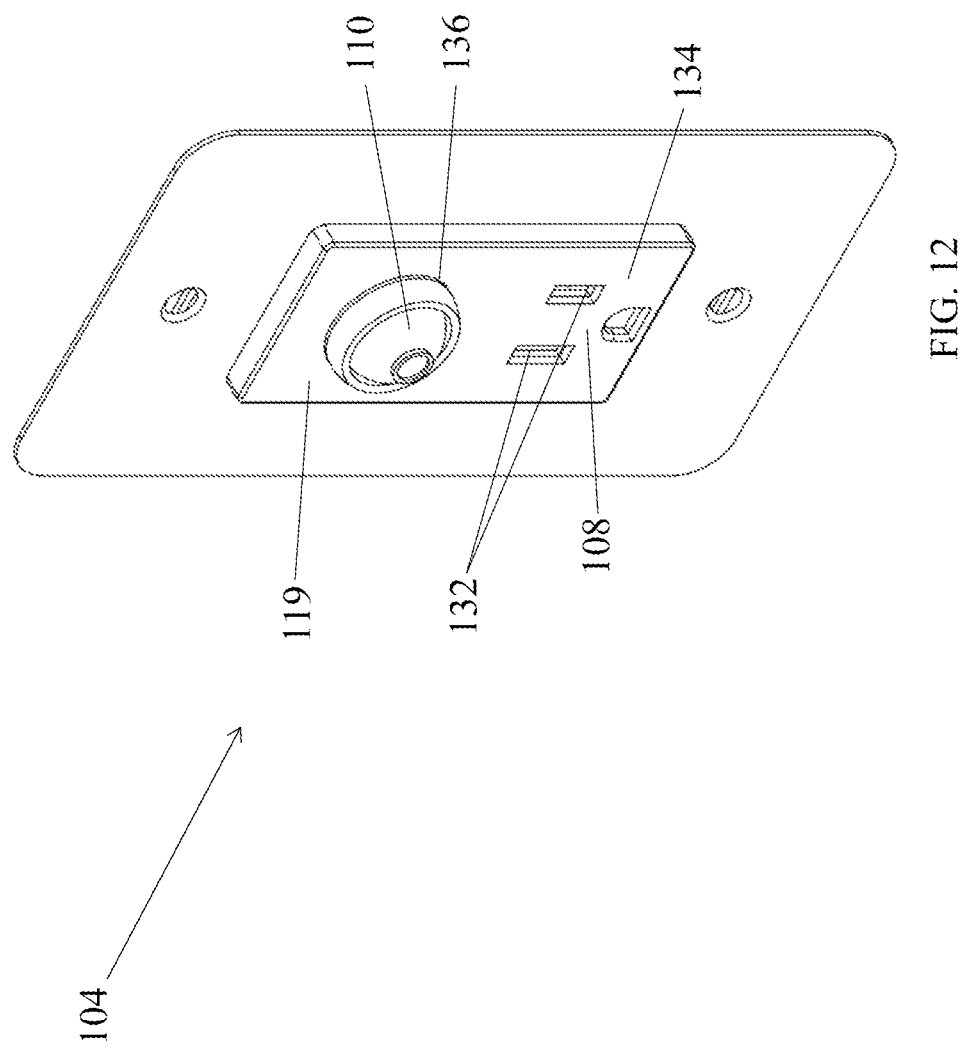
FIG. 12 is a perspective view of the electrical receptacle shown in FIG. 9 with a wall
plate installed.
Figure 13:
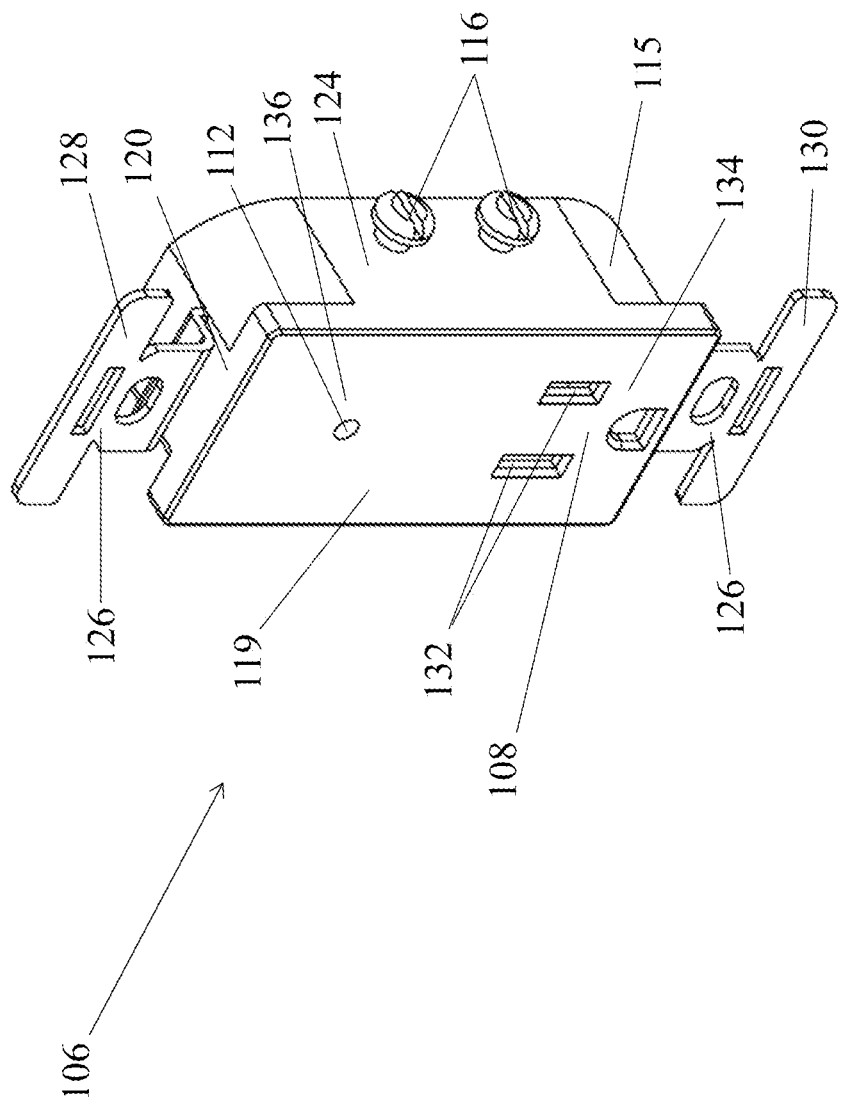
FIG. 13 is a perspective view of a first embodiment of an electrical receptacle with a
built-in camera.
Figure 14:
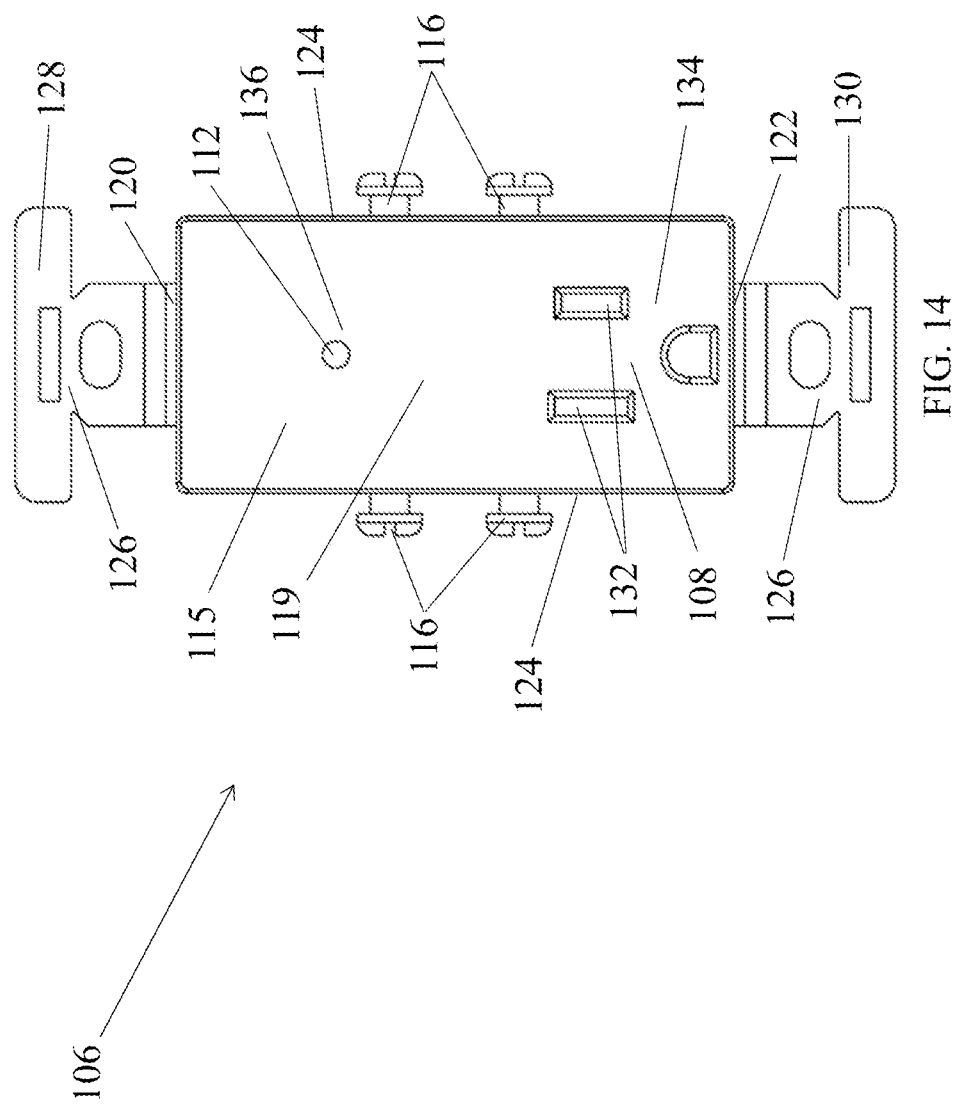
FIG. 14 is a front view of the electrical receptacle shown in FIG. 13.

Turning to FIGS. 5-8, the electrical outlet 102 is largely the same as the electrical outlet 100. The electrical outlet 102 comprises the electrical outlet body 114, the plurality of screws 116, the electrical receptacle 108, and a camera 112. Thus, the key difference between the electrical outlet 100 and the electrical outlet 102 is that the camera 112 replaces the camera 110. The camera 112 is exposed on the front face 118 of the electrical outlet body 114 and may be located between the top surface 120 and the electrical receptacle 108. As shown in FIG. 7, the camera 112 does not extend forward from the front surface 118. The camera 112 thus has a smaller size and profile and is less noticeable. The majority of the camera 112 is located behind the front surface 118 within the electrical outlet body 114. The camera 112 may be configured to rotate within the electrical outlet body 114 to capture images at different angles.

The camera 112 may be aligned with the electrical receptacle 108 along an axis passing through the top surface 120 and the bottom surface 122 of the electrical outlet body 114. In some embodiments, the electrical outlet 102 is incorporated into a duplex-style outlet. The duplex-style outlet has a first electrical receptacle position 134 and a second electrical receptacle position 136. In such an embodiment, the electrical receptacle 108 is located in the first electrical receptacle position 134 and the camera 112 is located in the second electrical receptacle position 136. The camera 112 is configured to receive power from the plurality of screws 116, generate video data, and transmit the video data to an external device. The video data may be transmitted wirelessly, such as over Bluetooth or Wi-Fi. Alternatively, the camera 112 may be hardwired to the external device and the video data may be transmitted through the hardwired connection. The external device may be a device with internet connectivity which makes the video available for viewing online. Alternatively, the external device may be a monitor which displays the video data. The camera 112 may receive power from the printed circuit board 138 and may pass the video data to the printed circuit board 138 for transmission to the external device.

Turning to FIGS. 9-12, the electrical outlet 104 is largely the same as the electrical outlet 100. The electrical outlet 104 comprises an electrical outlet body 115, the plurality of screws 116, the electrical receptacle 108, and the camera 110. The key difference between the electrical outlet 100 and the electrical outlet 104 is that the electrical outlet 104 is a Decora-style electrical outlet. Therefore, the electrical outlet body 115 has a front face 119 with a rectangular shape, as shown.

Figure 15:
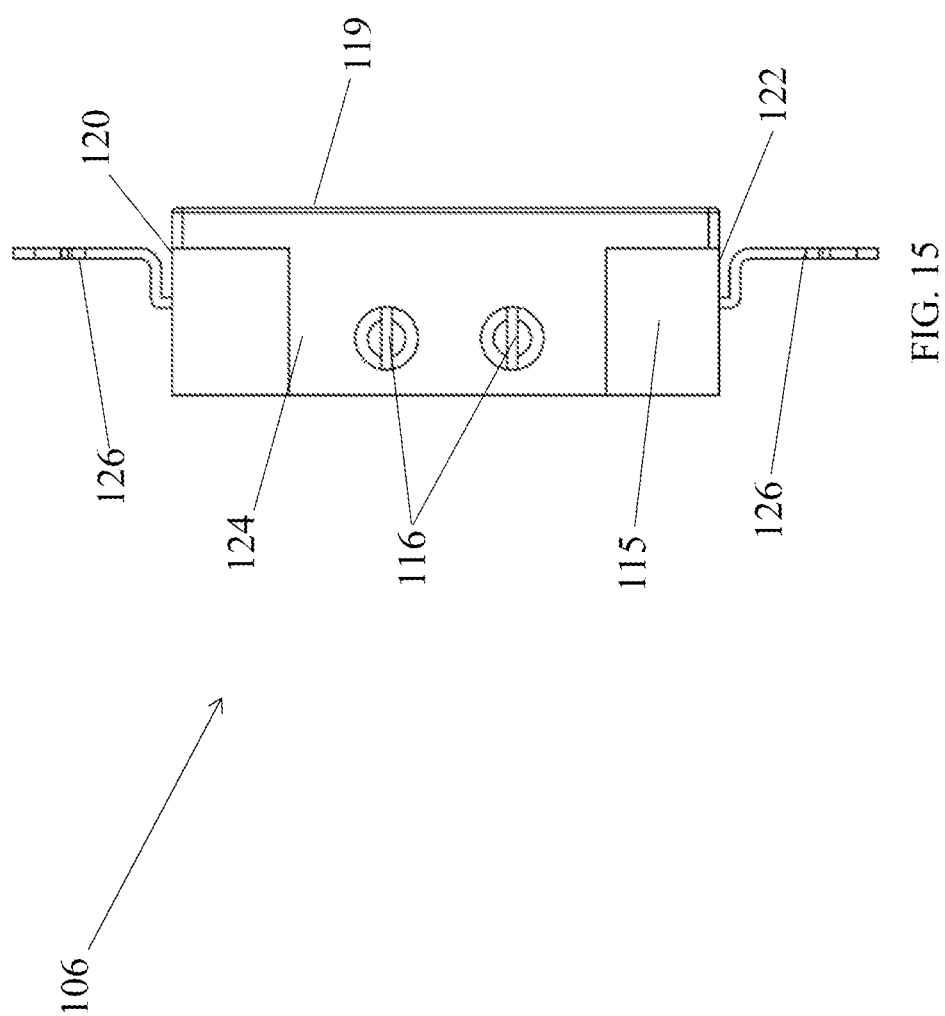
FIG. 15 is a side view of the electrical receptacle shown in FIG. 13.
Figure 16:
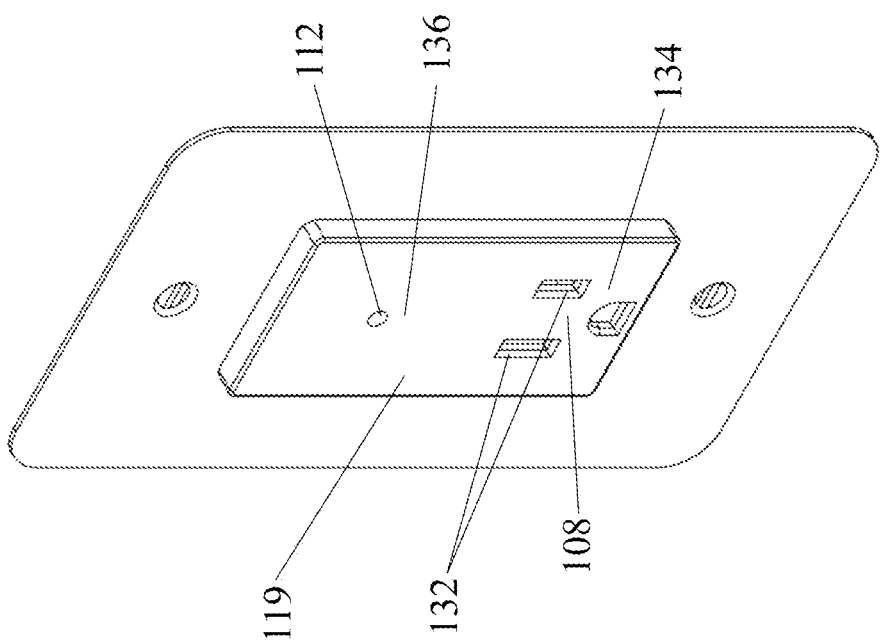
FIG. 16 is a perspective view of the electrical receptacle shown in FIG. 13 with a wall
plate installed.

Turning to FIGS. 13-16, the electrical outlet 106 is largely the same as the electrical outlet 100. The electrical outlet 106 comprises the electrical outlet body 115, the plurality of screws 116, the electrical receptacle 108, and the camera 112. Thus, the key differences between the electrical outlet 100 and the electrical outlet 106 are that the electrical outlet 106 is a Decora-style electrical outlet and that the camera 112 replaces the camera 110. Therefore, the electrical outlet body 115 has a front face 119 with a rectangular shape, as shown. The camera 112 is exposed on the front face 119 of the electrical outlet body 115 and may be located between the top surface 120 and the electrical receptacle 108. As shown in FIG. 15, the camera 112 does not extend forward from the front surface 119. The camera 112 thus has a smaller size and profile and is less noticeable. The majority of the camera 112 is located behind the front surface 119 within the electrical outlet body 115. The camera 112 may be configured to rotate within the electrical outlet body 115 to capture images at different angles.

The camera 112 may be aligned with the electrical receptacle 108 along an axis passing through the top surface 120 and the bottom surface 122 of the electrical outlet body 115. In some embodiments, the electrical outlet 106 is incorporated into a duplex-style outlet. The duplex-style outlet has a first electrical receptacle position 134 and a second electrical receptacle position 136. In such an embodiment, the electrical receptacle 108 is located in the first electrical receptacle position 134 and the camera 112 is located in the second electrical receptacle position 136. The camera 112 is configured to receive power from the plurality of screws 116, generate video data, and transmit the video data to an external device. The video data may be transmitted wirelessly, such as over Bluetooth or Wi-Fi. Alternatively, the camera 112 may be hardwired to the external device and the video data may be transmitted through the hardwired connection. The external device may be a device with internet connectivity which makes the video available for viewing online. Alternatively, the external device may be a monitor which displays the video data. The camera 112 may receive power from the printed circuit board 138 and may pass the video data to the printed circuit board 138 for transmission to the external device.

Because the camera 110, 112 is built into the electrical outlet 100, 102, 104, 106, the camera 110, 112 is able to provide additional security from what a typical camera plugged into the wall can provide. For example, a toddler is unable to unplug the camera 110, 112 and an intruder is less likely to notice the presence of the camera 110, 112 because the camera 110, 112 has a low profile and a small size.

It will be understood that implementations of an electrical receptacle with a built-in camera are not limited to the specific assemblies, devices and components disclosed in this document, as virtually any assemblies, devices and components consistent with the intended operation of an electrical receptacle with a built-in camera may be used. Accordingly, for example, although particular electrical receptacles, and other assemblies, devices and components are disclosed, such may include any shape, size, style, type, model, version, class, measurement, concentration, material, weight, quantity, and/or the like consistent with the intended operation of electrical receptacles with built-in cameras. Implementations are not limited to uses of any specific assemblies, devices and components; provided that the assemblies, devices and components selected are consistent with the intended operation of an electrical receptacle with a built-in camera.

Accordingly, the components defining any electrical receptacle with a built-in camera may be formed of any of many different types of materials or combinations thereof that can readily be formed into shaped objects provided that the components selected are consistent with the intended operation of an electrical receptacle with a built-in camera. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various electrical receptacles may be manufactured using conventional procedures as added to and improved upon through the procedures described here. Some components defining an electrical receptacle with a built-in camera may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling electrical receptacles are not limited to the specific order of steps as disclosed in this document. Any steps or sequence of steps of the assembly of an electrical receptacle with a built-in camera indicated herein are given as examples of possible steps or sequence of steps and not as limitations, since various assembly processes and sequences of steps may be used to assemble electrical receptacles.

The implementations of an electrical receptacle with a built-in camera described are by way of example or explanation and not by way of limitation. Rather, any description relating to the foregoing is for the exemplary purposes of this disclosure, and implementations may also be used with similar results for a variety of other applications employing an electrical receptacle with a built-in camera.

What is claimed is:

1. An electrical outlet for attachment to an electrical box, comprising:
    an electrical outlet body having a front face surrounded by a top surface, a bottom surface, and two side surfaces, and at least two yokes extending away from the body, wherein a first yoke of the at least two yokes extends away from the top surface of the body and a second yoke of the at least two yokes extends away from the bottom surface of the body, the first and second yokes configured to align with box mounting screw apertures of an electrical box, wherein a wall plate is configured to be installed on the electrical outlet and surround the electrical outlet body and wherein the front face of the electrical outlet body is seamless and is formed as a single piece;
    a plurality of screws extending away from the two side surfaces of the body and each configured to couple with at least one of a plurality of electrical wires and provide power to the electrical outlet;
    only one electrical receptacle on the front face having at least two plug apertures extending into the front face of the body, wherein the at least two plug apertures are electrically coupled to the plurality of screws and configured to provide power to an electrical plug when the electrical plug is inserted into the only one electrical receptacle;
    a printed circuit board inside the body electrically coupled to the plurality of screws and configured to wirelessly transmit data generated by the electrical outlet to an external device; and
    a camera integrated with the electrical outlet body and exposed on the front face and aligned with the only one electrical receptacle along an axis passing through the top surface and the bottom surface of the body, wherein the camera is electrically coupled to the printed circuit board and is configured to receive power from the printed circuit board, generate video data, and pass the video data to the printed circuit board for transmission to the external device, wherein when the wall plate is installed on the electrical outlet, the front face of the electrical outlet body extends forward from the wall plate, and wherein the camera extends forward from the front face of the electrical outlet body.

2. The electrical outlet of claim 1, wherein the electrical outlet is incorporated into a duplex-style outlet having a first electrical receptacle position and a second electrical receptacle position, the only one electrical receptacle is located in the first electrical receptacle position, and the camera is located in the second electrical receptacle position.

3. The electrical outlet of claim 1, wherein the front face has a rectangular shape.

4. The electrical outlet of claim 1, wherein the camera is located between the top surface and the only one electrical receptacle.

5. The electrical outlet of claim 1, wherein the camera is configured to rotate within the body.

6. An electrical outlet for attachment to an electrical box, comprising:
    an electrical outlet body having a front face surrounded by a top surface, a bottom surface, and two side surfaces, and at least one yoke extending away from the body, the at least one yoke configured to align with box mounting screw apertures of an electrical box, wherein a wall plate is configured to be installed on the electrical outlet and surround the electrical outlet body;
    a plurality of screws extending away from the body and each configured to couple with at least one of a plurality of electrical wires and provide power to the electrical outlet;
    an electrical receptacle on the front face having a plurality of plug apertures extending into the front face of the body, wherein the plurality of plug apertures is electrically coupled to the plurality of screws and configured to provide power to an electrical plug when the electrical plug is inserted into the electrical receptacle; and a camera integrated with the electrical outlet body and exposed on the front face and aligned with the electrical receptacle along an axis passing through the top surface and the bottom surface of the body, wherein the camera is configured to receive power from the plurality of screws, generate video data, and transmit the video data to an external device, wherein when the wall plate is installed on the electrical outlet, the front face of the electrical outlet body extends forward from the wall plate, and wherein the camera extends forward from the front face of the electrical outlet body.

7. The electrical outlet of claim 6, wherein the electrical receptacle is only one electrical receptacle.

8. The electrical outlet of claim 6, wherein the front face has a rectangular shape.

9. The electrical outlet of claim 6, wherein the electrical outlet is incorporated into a duplex-style outlet having a first electrical receptacle position and a second electrical receptacle position, the electrical receptacle is located in the first electrical receptacle position, and the camera is located in the second electrical receptacle position.

10. The electrical outlet of claim 6, wherein the camera is configured to wirelessly transmit the video data to an external device.

11. The electrical outlet of claim 6, wherein the camera is located between the top surface and the electrical receptacle.

12. The electrical outlet of claim 6, wherein the camera is configured to rotate within the body.

13. A single-gang electrical outlet, comprising:
an electrical outlet body having a front face bordered by a top surface and a bottom surface, and at least one yoke extending away from the body, the at least one yoke configured to align with box mounting screw apertures of an electrical box, wherein the front face of the electrical outlet body is seamless and is formed as a single piece;
a plurality of screws extending away from the body and each configured to couple with at least one of a plurality of electrical wires and provide power to the electrical outlet; and
a first electrical receptacle position on the front face and a second electrical receptacle position on the front face;
wherein an electrical receptacle is in the first electrical receptacle position, the electrical receptacle having a plurality of plug apertures extending into the front face of the body, wherein the plurality of plug apertures is electrically coupled to the plurality of screws and configured to provide power to an electrical plug when the electrical plug is inserted into the electrical receptacle; and
wherein a camera is integrated with the electrical outlet body in the second electrical receptacle position and the camera is configured to receive power from the plurality of screws, generate video data, and transmit the video data to an external device.

14. The electrical outlet of claim 13, wherein the first electrical receptacle position and the second electrical receptacle position are aligned along an axis passing through the top surface and the bottom surface of the body.

15. The electrical outlet of claim 13, further comprising a printed circuit board inside the body electrically coupled to the plurality of screws, wherein the camera is electrically coupled to the printed circuit board and receives power from the plurality of screws through the printed circuit board.

16. The electrical outlet of claim 13, wherein the electrical receptacle is only one electrical receptacle.

17. The electrical outlet of claim 13, wherein the front face has a rectangular shape.

18. The electrical outlet of claim 13, wherein the electrical outlet is incorporated into a duplex-style outlet.

19. The electrical outlet of claim 13, wherein the camera is located between the top surface and the electrical receptacle.

20. The electrical outlet of claim 13, wherein the camera is configured to rotate within the body.

\* \* \* \* \*